United States Patent [19]

Berggren et al.

[11] Patent Number: 4,559,093
[45] Date of Patent: Dec. 17, 1985

[54] METHOD FOR RETREADING VEHICLE TIRES

[75] Inventors: Benny Berggren, Vällingby; Ninneh Gripenholt, Lidköping, both of Sweden

[73] Assignee: Q&Q Retreading System AB, Lipköping, Sweden

[21] Appl. No.: 453,697

[22] Filed: Dec. 27, 1982

[30] Foreign Application Priority Data

Jan. 20, 1982 [SE] Sweden .............................. 8200313

[51] Int. Cl.⁴ .............................................. B29H 5/04
[52] U.S. Cl. .................................... 156/96; 156/130.5; 156/272.2; 156/275.5; 156/909; 219/10.55 R; 219/10.55 F; 219/10.55 M; 264/36; 425/17; 427/45.1
[58] Field of Search ............. 156/95, 96, 128.6, 130.5, 156/909, 421.6, 272.2, 275.5; 425/17, 41; 427/45.1; 219/10.55 M, 10.55 R, 10.55 F, 10.55 E; 264/36

[56] References Cited

U.S. PATENT DOCUMENTS

| | | | |
|---|---|---|---|
| 2,738,406 | 3/1956 | Zaleski | 219/10.55 R |
| 3,689,337 | 9/1972 | Schelkmann | 156/96 |
| 3,783,220 | 1/1974 | Tanizaki | 219/10.55 E |
| 3,867,606 | 2/1975 | Peterson | 219/10.55 F |
| 3,883,382 | 5/1975 | Pelletier | 156/96 |
| 3,894,897 | 7/1975 | Batchelor et al. | 156/128.6 |
| 3,925,129 | 12/1975 | Blankenship | 156/96 |
| 3,935,045 | 1/1976 | Wolfe | 156/96 |
| 3,938,266 | 2/1976 | Cook | 156/584 |
| 3,989,563 | 11/1976 | Schelkmann | 156/96 |
| 4,098,936 | 7/1978 | Rawls | 156/96 |
| 4,123,306 | 10/1978 | Landry | 156/96 |
| 4,137,112 | 1/1979 | Hedlund | 152/361 R |
| 4,157,464 | 6/1979 | Smith et al. | 219/10.55 F |
| 4,157,930 | 6/1979 | Björkman et al. | 156/96 |
| 4,208,562 | 6/1980 | Perreault | 264/26 |
| 4,362,917 | 12/1982 | Freedman et al. | 219/10.55 F |

Primary Examiner—Lois E. Boland
Attorney, Agent, or Firm—Silverman, Cass & Singer, Ltd.

[57] ABSTRACT

A method for retreading vehicle tires. A carcass is provided with a prevulcanized tread and an unvulcanized tie-gum layer between the carcass and tread. A microwave applicator is located above the tread for emitting microwaves to the tire for creating heat energy in the tire. A reflector for microwaves comprising an electrically conductive material is attached in connection to or in the tie-gum layer to achieve high quality rapid vulcanization without heating the carcass.

6 Claims, 5 Drawing Figures

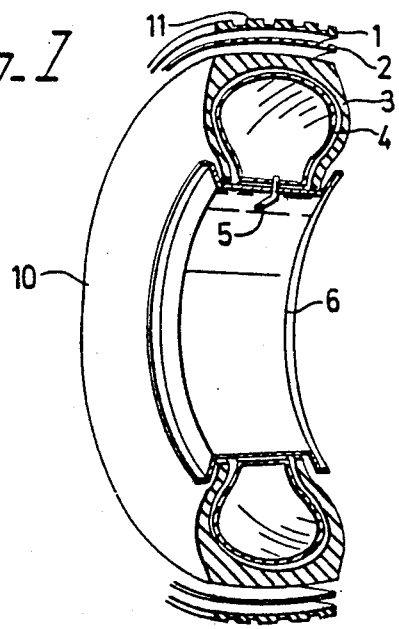
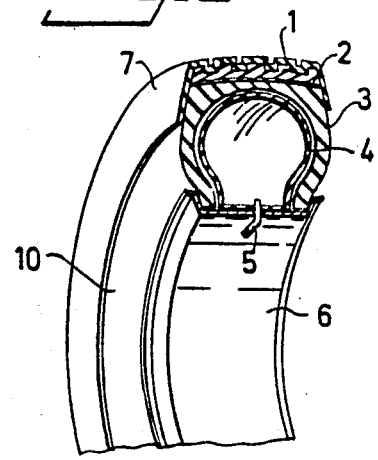
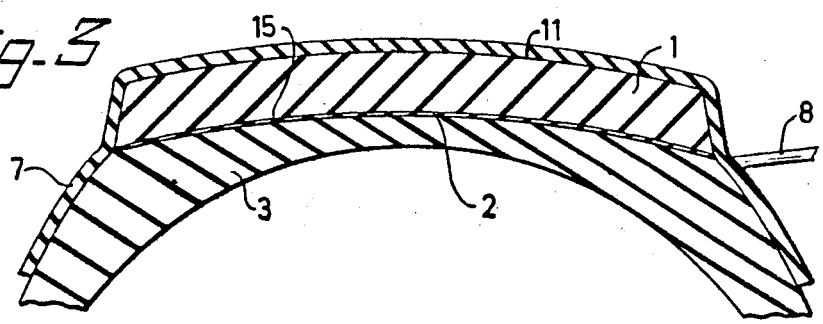
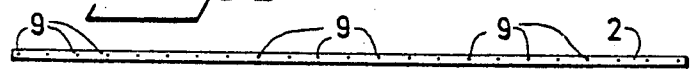
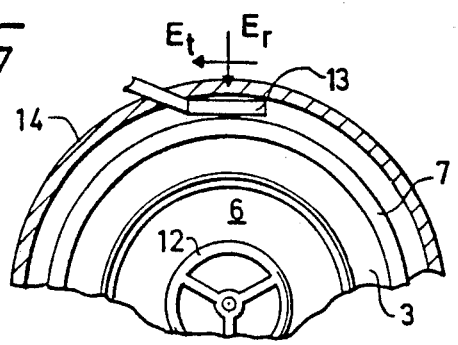

METHOD FOR RETREADING VEHICLE TIRES

BACKGROUND OF THE INVENTION

This invention relates to a method for the retreading of vehicle tires.

At the retreading of vehicle tires, a new tread is applied to a carcass and vulcanized therewith by means of a binder layer.

Due to the recent substantial rise of the raw material price, it has become more interesting to retread vehicle tires, above all such for heavy vehicles, but also for passenger cars.

Conventional methods of retreading tires, however, are very time-consuming and, thus, expensive. Vehicle tires can be retreaded according to two main methods. At one of them a carcass is provided with a new prevulcanized tread, after the old tread has been removed by grinding. At this method a tiegum layer is placed between carcass and tread. The tire thus provided with a new tread is vulcanized in an autoclave at overpressure and at a temperature of about 60° C. to 150° C. It takes about two to five hours according to this method to attach the tread by vulcanization to the carcass. The heating medium used is a heated fluid, for example steam. There exist different variants of this schematically described method, for example the so-called bandag system, the so-called Vacuum-Vulc System and the so-called Vulcap system, which are described in U.S. Pat. No. 4,157,930. At the second one of the said two main methods, an unvulcanized new tread is positioned about a carcass, whereafter the tread as well as the connection between tread and carcass are vulcanized.

In the aforesaid U.S. Patent a method of shortening the vulcanization time is described. According to this method, microwave energy is used for heating the tie-gum layer whereby said layer is vulcanized both against a prevulcanized tread and the carcass. The tie-gum used according to this method has a higher dissipation factor at the vulcanization temperature than the prevulcanized tread, in order thereby to concentrate the heating to the tie-gum layer.

The microwave energy is supplied by an applicator located outside the tire periphery while the tire is being rotated.

By the method according to said U.S. Patent the vulcanization time is reduced substantially. The method, however, shows several disadvantages. One disadvantage is that the prevulcanized tread yet is heated much more than desired. Furthermore, during the vulcanization process the entire carcass is heated. These disadvantages are due to the fact, that at the vulcanization temperature, or about the same, the energy is concentrated on the tie-gum layer, because the tie/gum layer then has a higher dissipation factor than the tread and the carcass. In order to rapidly increase the temperature of the tie-gum layer, the carcass is filled with hot water, thereby preventing too great a heat development in the carcass and tread. By heating the carcass and tread, namely, they are subjected to ageing, and as a result thereof their service life is reduced.

At the method disclosed in said U.S. Patent, thus, the tie-gum must be selected especially in view of the material of the carcass and tread. It further is necessary, as mentioned, to heat the carcass, and therewith the tie-gum, prior to the application of microwave energy. This method, thus, subjects both the carcass and tread to undesired heating.

SUMMARY OF THE INVENTION

The present invention offers a method, which is much simpler and more rapid than the one described above. The present invention, besides, implies that a more uniform quality level is achieved, and that unnecessary heating of carcass and tread is avoided.

The present invention, thus, relates to a method of retreading vehicle tires, at which method a carcass is provided with a prevulcanized tread and with an unvulcanized tie-gum layer between the carcass and tread, and at which a microwave applicator is located above the tread to transmit microwaves against the tire for creating heating energy in the tire.

The invention is characterized in that a reflector for microwaves, comprising an electrically conductive material, is attached adjoining or in the tie-gum layer, thus between the carcass and the prevulcanized tread. The invention of a divisonal application of which the present application is the parent relates to an apparatus for the retreading of vehicle tires, by which apparatus a carcass is provided with a prevulcanized tread and an unvulcanized tie-gum layer between the carcass and tread, and at which by means of a microwave applicator located above the tire microwaves are emitted against the tire for creating heat energy in the tire. The apparatus is characterized in that it comprises a reflector for microwaves, which reflector comprises an electrically conductive material and is intended to be attached at or in the tie-gum layer.

BRIEF DESCRIPTION OF THE DRAWING

The invention is described in greater detail in the following, with reference to the accompanying drawing, in which FIG. 1 is a schematic cross-section of a tire, partially in an exploded view, FIG. 2 is a schematic cross-section of a tire in the state prevailing at vulcanization, FIG. 3 is a cross-section of an outer portion of a tire on an enlarged scale, FIG. 4 is a cross-section of a web-shaped tie-gum according to one embodiment of the invention, and FIG. 5 shows a portion of a tire in a holding device and a portion of a microwave applicator.

DESCRIPTION OF THE PREFERRED EMBODIMENTS

In FIG. 1 a cross-section of a tire 10 is shown schematically, which tire comprises a tread 1, a tie-gum 2, a carcass 3, an inner tube 4 and a valve 5. The tire is mounted on a rim 6. On a tire to be retreaded the old tread is removed by grinding so that only the carcass 3 remains. Thereafter a tie-gum layer 2 is applied on the outside of the carcass 3, and a completely vulcanized tread 1 is applied on the tie-gum layer 2. On a tire 10 thus prepared for vulcanization a so-called envelope 7 is threaded, i.e. a casing enclosing the outer portion of the tire 10. The said envelope has the object to maintain the tread 1 and the tie-gum layer 2 in place relative to the carcass 3 while the tie-gum layer is being vulcanized. On said envelope 7 a valve 8 is located for evacuating air between the envelope 7 and tread 1.

At known vulcanization methods the tire 10 enclosed by an envelope 7 is inserted in an autoclave, and the entire tire thereafter is heated, for example by steam, while overpressure prevails both in the autoclave and in the inner tube 4 of the tire. When the vulcanization temperature has been achieved and maintained for a sufficient time, the tire is cooled.

At the method described in the aforesaid patent, the tire 10 is placed into an autoclave with an overpressure prevailing therein. The inner tube of the tire is filled with hot water in order to heat the tie-gum layer 2 from the inside and pressure is applied thereon. Thereafter the tie-gum layer 2 and also the tread 1 are heated by means of microwave energy, which is fed through the tread 1 by a microwave applicator while the tire 10 rotates. This lastmentioned method has several disadvantages, viz. as mentioned that the carcass 3 and also the tread 1 are unnecessarily much heated, and that the heating of the carcass with hot water is time-consuming and cost-increasing. When microwave energy is used for vulcanization, as set forth in U.S. Pat. No. 4,157,930, in the case of steel radial tires the steel cord is a reflector for emitted microwaves. The distance, however, from the surface of the tread to the steel cord varies substantially across the width of the tread, and the steel cord has not the same width as the tie-gum layer. Hereby, thus, the heat is distributed non-uniformly in the tie-gum layer, and at the same time difficulties arise in heating the outer portions of the tie-gum layer to a sufficient extent. This implies substantial difficulties in manufacturing a fully satisfactory product.

According to the present invention, the tire 10 is prepared as described above inclusive of threading-on an envelope 7, but with the essential difference that a reflector for microwaves, comprising an electrically conductive material, is attached in connection to or in the tie-gum layer 2, i.e. between the carcass 3 and the prevulcanized tread 1.

At a first preferred embodiment of the invention, a web-shaped tie-gum 2 is used which includes electrically conductive material and is attached between the carcass 3 and the tread. The electrically conductive material preferably contains wires 9, which are arranged in parallel spaced relationship with each other. According to a preferred embodiment, the wires 9 extend in the circumferential direction of the tire 10, i.e. in the longitudinal direction of the web-shaped tie-gum.

FIG. 4 is a cross-section of a web-shaped tie-gum identical with the cross-section according to FIG. 3. In FIG. 4 wires 9 are shown, which are cast-in in an unvulcanized tie-gum layer 2 and uniformly distributed across the width of the tie-gum web 2.

A tie-gum layer 2 normally has a thickness of about 1.5 to 2 mm. It was found that in that case wires with a diameter of about 0.10 to 0.20 mm are suitable. Suitable wire materials are steel and copper, but also other electric conductors can be used. The distance between the wires relative to each other depends on the frequency of emitted microwaves. Said distance should be about $\lambda/12$ where $\lambda$ is the wave length of emitted microwaves. A microwave frequency suitable for this purpose is 2450 megacycles per second. When this frequeny is used, it was found suitable to arrange the wires at a spaced relationship of 5 mm to 15 mm, preferably of 10 mm.

It is, of course, not necessary to cast-in such wires in the unvulcanized tie-gum layer, but the wires may be attached in some other way.

According to a second preferred embodiment of the invention, electrically conductive material in the form of wires or a net is attached either on top of the carcass 3 prior to the application of the tie-gum layer 2 or on top of the tie-gum layer after the application thereof. In the lastmentioned case the electrically conductive material can be attached in a first step to the lower surface of the tread 1.

The aforesaid embodiments have in common that the material provided as reflector for microwaves is caused to cover a width corresponding to the width of the tie-gum layer 2. This ensures substantially equal conditions, from a microwave aspect, across the entire tie-gum layer.

The present invention, as mentioned in the introductory part, also relates to an apparatus for carrying out said method.

The apparatus comprises a reflector for microwaves, which includes an electrically conductive material and is intended to be attached to or in the tie-gum layer. The structural design of the apparatus and its different embodiments are clearly apparent from the above description of said method according to the invention.

By attaching wires 9 of electrically conductive material in or at the tie-gum 2 the electric field of intensity, and therewith the microwave energy, are concentrated to the position of the wires. The tangentially located component of the electric field of intensity ($E_t$) is short-circuited in that the wires 9 extend in the circumferential direction of the tire 10. As a result thereof, the radially located component ($E_r$) is at maximum at the wires 9, see FIG. 5.

The energy density of microwave energy, thus, increases from the surface 11 of the tread 1 inward to the tie-gum layer 2. This implies that the heat development in the tread 1 increases from the surface thereof to the transition of the tread to the tie-gum layer 2. Hereby the tread 1 is heated most at the tiegum layer 2. The heat developed is transferred conductively to the tie-gum layer 2, which thereby is heated to vulcanization temperature. Heat energy, of course, also is developed directly by the microwave energy in the tie-gum layer 2, to an extent corresponded by the chemical composition of the tie-gum layer.

Vulcanized rubber normally has a dissipation factor exceeding that of unvulcanized rubber at the vulcanization temperature. In the aforesaid U.S. Pat. No. 4,157,930, however, tie-gum compounds are stated which have a higher dissipation factor than a vulcanized tread.

By attaching a reflector such as electrically conductive wires in the tie-gum layer, thus, the tie-gum layer is heated to vulcanization temperature substantially independent of the microwave properties of the tie-gum. At the same time, the tread 1 is heated only partially and most near the tie-gum layer 2.

When vulcanization is carried out according to the present invention, the tire is positioned into an autoclave 14 of known conventional type. The rim 6 is mounted by a holding member 12 in a driven rotary shaft. One or more microwave applicators 13 are provided in the autoclave 14 in connection to the periphery of a positioned tire 10. The autoclave 14 is only partially shown in FIG. 5.

The interior of the autoclave 14 is pressurized with air, for example to the pressure 7 bar, and the inner tube of the tire 10 is pressurized with air to, for example, 9 bar. The air in the autoclave 14 as well as in the tire 10 is of room temperature. Thus, neither the interior nor the exterior of the tire is preheated. Subsequent to the pressurization of the autoclave 14 and tire 10, the tire is rotated by said shaft and microwave energy is supplied against the tire by means of the applicator(s).

As described above, heat is hereby developed uniformly distributed about the tire. As an example can be mentioned, that the time for heating the tie-gum layer 2 of a truck tire to the vulcanization temperature, about 140° C. to 150° C., is about 7 minutes. At this temperature the vulcanization of the tie-gum layer 2 is carried out during 10 to 12 minutes. The tire is thereafter removed from the autoclave 14, and said envelope 7 is taken off. The tire is then ready.

By means of the present method the entire carcass is substantially maintained cold during the entire process. Due to the fact that the heat development to its greatest part occurs in connection to the tie-gum layer 2, also the outer portions of the tread are maintained substantially cold. In spite of these advantages, the vulcanization time is as short as 17 to 20 minutes, which is particularly essential for reducing the retreading costs, compared to known methods.

The completely vulcanized tread 1, at substantially all retreading methods, has a substantially constant thickness and a lower surface 15, which bellies only slightly. By the present method, at which the reflector for microwaves is attached at or in the tie-gum layer, the penetration depth for the microwaves through the tread 1 to the reflector is substantially constant across the width of the tread 1 or tie-gum layer 2, which in its turn implies that the heat developed is substantially uniformly distributed across the width of the tie-gum layer 2.

When microwave energy is used for vulcanization, as described in the afore-mentioned patent, the tie-gum layer as described above is heated non-uniformly across its width. It is obvious that the present invention renders rapid vulcanization possible substantially without giving rise to a heating of the outer portions of the carcass and tread. The vulcanization, in addition, has a very uniform and high quality.

It further is obvious that the method can be applied to any type of tire, for example to tires with textile cord as well as to tires with steel cord and to tires of different dimensions and structural designs. Even tires with a cord of glass fibres or Kevlar ® can be retreaded according to the present invention.

The invention, of course, can be varied in many ways. The reflector, for example, can be designed as a net of some kind, as wires intersecting each other, narrow strips etc.

The reflector also may consist of a tie-gum, which has been provided with a sufficient amount of a pulverous electrically conductive material to become electrically conductive at the microwave frequencies intended.

The reflector also can be applied immediately prior to the retreading process or it may be prefabricated, for example, by being cast-in in the lower surface of the tread, as mentioned above.

In the foregoing, pressures and dimensions have been stated by way of example. Pressures, dimensions and microwave applicators, of course, must be selected and designed in view of the tires to be retreaded.

The present invention, therefore, must not be regarded restricted to the embodiments set forth above, but can be varied within the scope of the attached claims.

What is claimed is:

1. A method of retreading vehicle tires comprising the steps of providing an assembly comprising an unvulcanized tie-gum layer between a prevulcanized tire carcass and a prevulcanized tread, providing an electrically conductive reflector for microwaves in association with the tie-gum layer between the carcass and the tread, and locating a microwave applicator above the tread and emitting microwaves having an electrical field with tangential and radial components to the assembly, said reflector being of a width corresponding to the width of the tie-gum layer and arranged to short circuit the electric field component in the tangential direction of the assembly, so as to maximize the radially directed component of the electrical field to heat the tie-gum layer to vulcanization temperature substantially independent of the microwave properties of the tie-gum layer or carcass.

2. A method as claimed in claim 1 in which the tie-gum layer is web-shaped and is attached between the carcass and the tread.

3. A method as claimed in claim 1 or 2 in which the tie-gum layer includes wires of electrically conductive material arranged in parallel spaced relationship.

4. A method as claimed in claim 2 in which the tie-gum layer includes wires of electically conductive material extending in the circumferential direction of the tire and the longitudinal direction of the web-shaped tie-gum layer.

5. A method as claimed in claim 1 in which the electrically conductive reflector is formed of wires and is attached on top of the carcass prior to application of the tie-gum layer.

6. A method as claimed in claim 1 in which the electrically conductive reflector is formed of wires and is attached on top of the tie-gum layer after application thereof.

* * * * *